US009595024B2

(12) United States Patent
Argue et al.

(10) Patent No.: US 9,595,024 B2
(45) Date of Patent: Mar. 14, 2017

(54) REPRINT OF A PHYSICAL RECEIPT AND RECEIPT HISTORY FROM AN ELECTRONIC RECEIPT FOR REDUCING FRAUDULENT RETURNS

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 958 days.

(21) Appl. No.: 13/665,832

(22) Filed: Oct. 31, 2012

(65) Prior Publication Data

US 2014/0122276 A1    May 1, 2014

(51) Int. Cl.
| | | |
|---|---|---|
| *G07G 1/12* | (2006.01) | |
| *G07G 5/00* | (2006.01) | |
| *G06Q 20/04* | (2012.01) | |
| *G06Q 20/20* | (2012.01) | |
| *G06Q 20/32* | (2012.01) | |

(52) U.S. Cl.
CPC ........ *G06Q 20/0453* (2013.01); *G06Q 20/20* (2013.01); *G06Q 20/209* (2013.01); *G06Q 20/3276* (2013.01)

(58) Field of Classification Search
None
See application file for complete search history.

(56) References Cited

U.S. PATENT DOCUMENTS

| | | | |
|---|---|---|---|
| 5,739,512 | A | 4/1998 | Tognazzini |
| 5,748,737 | A | 5/1998 | Daggar |
| 6,067,529 | A | 5/2000 | Alperovich |
| 6,341,353 | B1 | 1/2002 | Herman |
| 6,487,540 | B1 | 11/2002 | Smith |
| 7,487,912 | B2 | 2/2009 | Seifert |
| 7,501,646 | B2 | 3/2009 | Ross |

(Continued)

FOREIGN PATENT DOCUMENTS

| | | |
|---|---|---|
| WO | WO0114995 A2 | 3/2001 |
| WO | WO0131535 A1 | 5/2001 |

(Continued)

OTHER PUBLICATIONS

Final Office Action (U.S. Appl. No. 13/665,818); Notification Date: Jan. 12, 2016.

*Primary Examiner* — Fateh M Obaid
(74) *Attorney, Agent, or Firm* — Howard & Howard Attorneys PLLC

(57) ABSTRACT

A method is disclosed for reprinting a paper copy of a receipt at a physical store location. The receipt printing may be based off of an electronic receipt. A customer may provide receipt identification to a returns associate at a POS terminal in a store location. Information may be sent to a server or computer system to request that a receipt be reprinted. The server may then process the request and transmit receipt information to the POS terminal where a paper copy of the receipt is printed for the returns associate. A modified receipt may be printed which includes receipt information for additional transactions. A modified receipt may be printed which includes additional information regarding items on the receipt.

12 Claims, 11 Drawing Sheets

(56) References Cited

U.S. PATENT DOCUMENTS

| | | |
|---|---|---|
| 7,685,020 B2 | 3/2010 | Do |
| 8,296,229 B1 | 10/2012 | Yellin |
| 8,433,614 B2 | 4/2013 | Rogers |
| 8,442,844 B1* | 5/2013 | Trandal ................ G06Q 30/012 705/35 |
| 8,595,062 B2 | 11/2013 | Junger |
| 2001/0029484 A1 | 10/2001 | Schultz |
| 2003/0055733 A1* | 3/2003 | Marshall ............ G06Q 20/0453 705/24 |
| 2005/0091117 A1* | 4/2005 | Phillips ................ G06Q 20/042 705/24 |
| 2005/0091130 A1* | 4/2005 | Phillips ................ G06Q 20/042 705/30 |
| 2007/0094087 A1 | 4/2007 | Mitchell |
| 2009/0164344 A1* | 6/2009 | Shiftan ................ G06Q 10/087 705/28 |
| 2009/0271265 A1 | 10/2009 | Lay |
| 2009/0271302 A1* | 10/2009 | Hamper ................ G06Q 10/10 705/30 |
| 2010/0174615 A1* | 7/2010 | Weaver ................ G06Q 30/02 705/26.1 |
| 2011/0125598 A1* | 5/2011 | Shin ...................... G06Q 10/10 705/17 |
| 2011/0161230 A1 | 6/2011 | Singh |
| 2012/0118976 A1 | 5/2012 | Debski |
| 2012/0284101 A1 | 11/2012 | Schiller et al. |
| 2012/0290609 A1 | 11/2012 | Britt |
| 2014/0019346 A1* | 1/2014 | Eliscu ................ G06Q 30/0633 705/40 |

FOREIGN PATENT DOCUMENTS

| | | |
|---|---|---|
| WO | WO0195170 A2 | 12/2001 |
| WO | 2009/134807 A2 | 11/2009 |
| WO | WO2010111591 A1 | 9/2010 |

* cited by examiner

US 9,595,024 B2

REPRINT OF A PHYSICAL RECEIPT AND RECEIPT HISTORY FROM AN ELECTRONIC RECEIPT FOR REDUCING FRAUDULENT RETURNS

RELATED U.S. APPLICATION

This application is related to U.S. application Ser. No. 13/665,818, filed Oct. 31, 2012. The application is incorporated herein by reference for all purposes.

BACKGROUND

Field of the Invention

This invention relates to receipts and receipt management systems and more particularly to systems and methods for allowing the reprint of a physical receipt and additional receipt history from a receipt such as an electronic receipt.

Background of the Invention

Many point-of-sale (POS) systems currently in use today do not support important emerging technologies. For example, current POS systems are limited in their ability to handle electronic receipts and to handle subsequent transactions based on electronic receipts. As a result, the adaptation of electronic receipts is hindered or prevented by the inability to provide the functionality associated with a paper receipt or to adequately handle subsequent transactions such as returns. Accordingly, what is needed is a system and method for facilitating use of electronic receipts.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
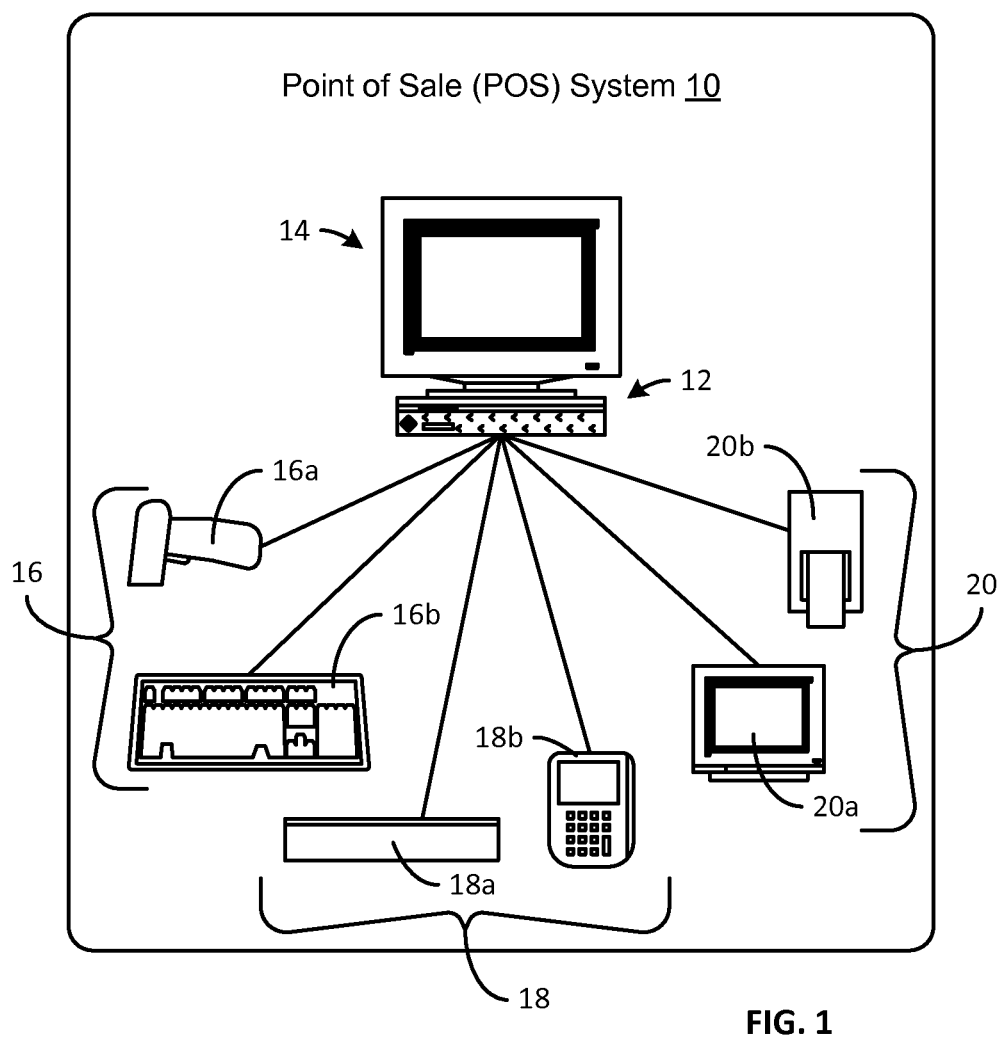
FIG. 1 is a schematic block diagram of one embodiment of a point-of-sale (POS) system for implementing methods in accordance with the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide a system and methods for managing receipts and for printing paper receipts and additional transaction history where a customer may have initially received an electronic receipt. In some instances, a paper copy of a receipt or a full history of a particular transaction may be needed. In some instances, additional information related to a receipt may be needed. A customer may have received an electronic receipt for a previous purchase at a store. An associate may need to verify the history for a particular transaction. For example, a sales associate may need to verify if there have been any additional transactions related to a particular item, such as a return, exchange, refund, etc. A sales associate may need to verify additional information related to a receipt or additional transactions related to a receipt to determine if it is proper for a customer to return an item.

In selected embodiments, a customer may utilize a mobile electronic device, such as a smart phone or tablet. An electronic receipt may be displayed or managed on the mobile electronic device and the device may include software which allows the customer to manage receipts. The software may allow the customer to interface with the electronic receipt and with the POS system.

In certain embodiments, a machine-readable code may be used to interact between the customer's mobile electronic device and the POS system. The machine readable code may comprise a conventional barcode or a two-dimensional barcode (e.g., a Quick Response (QR) Code). The data encoded within a machine-readable code may vary between different embodiments and different purposes or goals of the embodiment. In selected embodiments, a machine-readable code may encode a transaction identification (ID) uniquely identifying a particular transaction (e.g., purchase, return, or the like). Alternatively, or in addition thereto, a machine-readable code may encode data regarding the POS terminal and/or the store where the terminal is located.

In general, the purpose of a receipts system is to facilitate handling of receipts in a manner which is convenient to the customer and which also provides a desired measure of security. Many challenges arise in using electronic receipts. In particular, the use of electronic receipts when returning items raises a variety of challenges in ensuring that the returns process is handled in compliance with store policy and in ensuring that the store records and information about the initial sale transaction and the return transaction match the receipts maintained by the customer. For example, it is typically desirable to provide some security whereby a customer cannot easily complete a return for a product which they have not purchased or complete an additional return from a receipt for a product which they have already returned. It is also desirable to make the receipts management process streamlined and convenient, as this improves the customer experience as well as reduces the store workload.

In managing receipts, it may often be desirable to update the receipt or provide a more complete receipt history. This may ensure that the customer or a sales associate has accurate information about previous transactions.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support providing electronic receipts to customers and to support the reprint of paper receipts from electronic receipts. It will be appreciated that a customer may be printing or reprinting a paper receipt for the first, second, third, etc. time. For clarity, this is discussed as reprinting a receipt herein.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
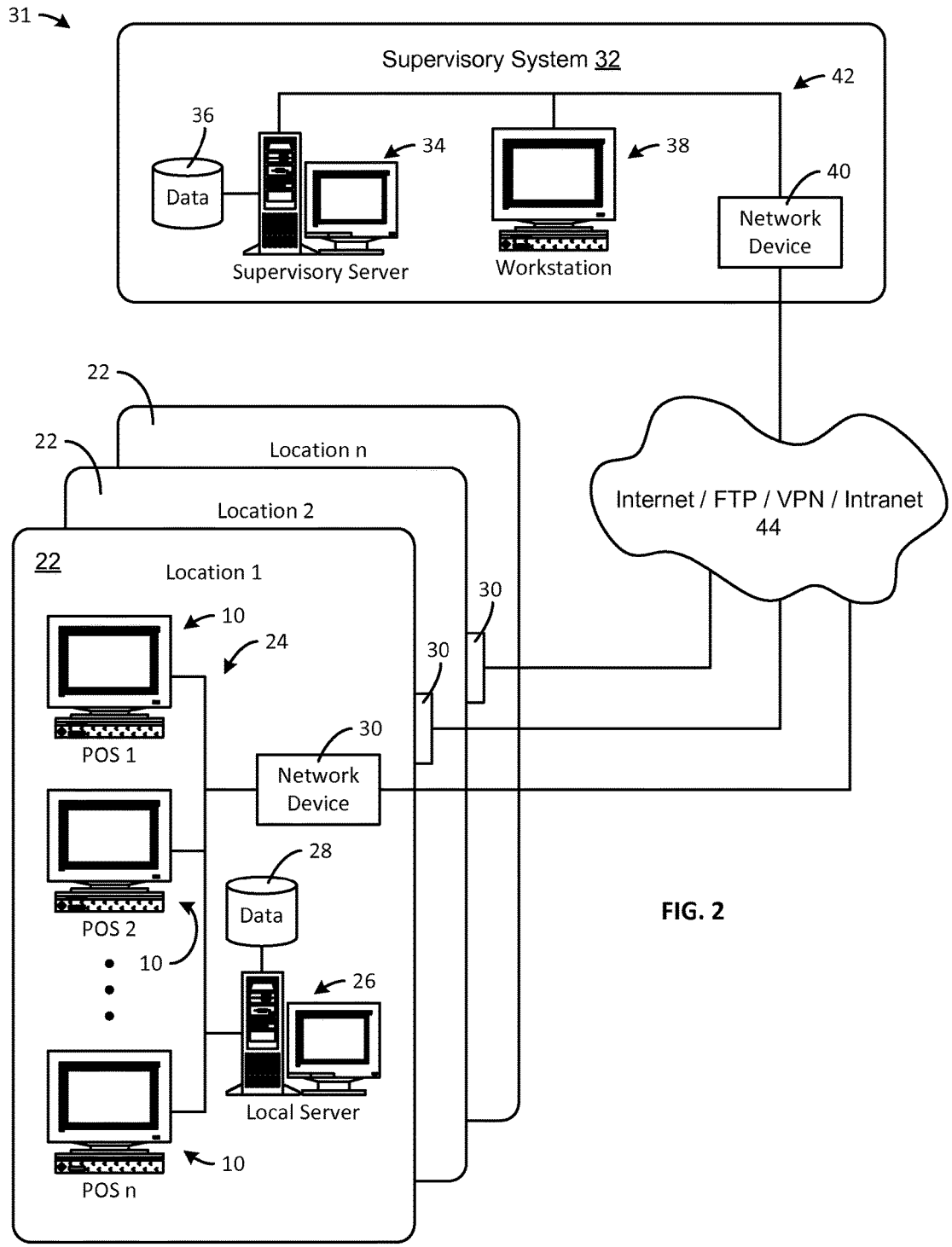
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a stand-alone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

It is thus appreciated that in discussing the functionality of the various POS terminals and servers, the present invention may be implemented in a system contained within a single location or across multiple locations. By way of example, the functionality accomplished by a server or computer, such as storing, processing, and transmitting receipt information, may be accomplished by a local computer or a remote computer such as servers 26 and 34.

Figure 3:
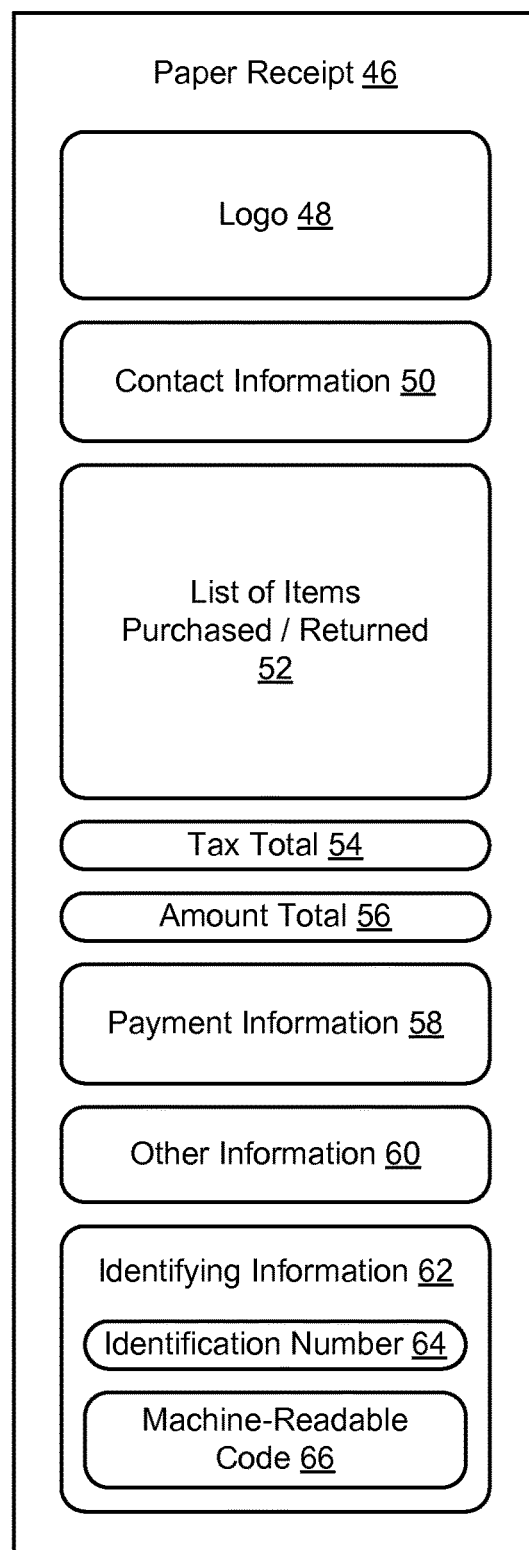
FIG. 3 is a schematic block diagram of one embodiment of a receipt in accordance with the present invention.

Referring to FIG. 3, in selected embodiments in accordance with the present invention, a POS system 10 may output a receipt 46. For example, a printer 20b of a POS system 10 may output a paper receipt 46. A receipt 46 may perform various functions. Primarily, a receipt 46 may document a financial transaction (e.g., sale or return). In selected embodiments, a receipt 46 may include a logo 48, contact information 50, a list 52 of items purchased or returned, a total 54 indicating the sales tax assessed or returned, a total 56 indicating 56 the amount paid or returned, payment information 58, other information 60, or the like or combinations or sub-combinations thereof.

By including store contact information 50 on a receipt 46, an entity may ensure that a customer has ready access to one or more physical addresses, Internet address, telephone numbers, facsimile numbers, hours of operation, or the like or combinations or sub-combinations thereof. One or more of a list 52 of items purchased or returned, a total 54 indicating the sales tax assessed or returned, a total 56 indicating 56 the amount paid or returned, and payment information 58 (e.g., date of transaction, an indication of method of payment, an indication of which credit or debit card was used, etc.) may be included to document important details of a transaction.

Other information 60 may be included within a receipt 46 as desired or necessary. In selected embodiments, a receipt 46 may include identifying information 62. Information 62 may include an identification number 64 which identifies the particular transaction associated with the receipt 46. Additionally, the identifying information 62 may include a machine-readable code 66. The code 66 may also provide information to identify the transaction associated with the particular receipt 46. The identifying information may include information such as the store where the items were purchased, the time of purchase, the total price of the transaction, etc.

A machine-readable code 66 may comprise a barcode. For example, in certain embodiments, a machine-readable code 66 may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

Figure 4:
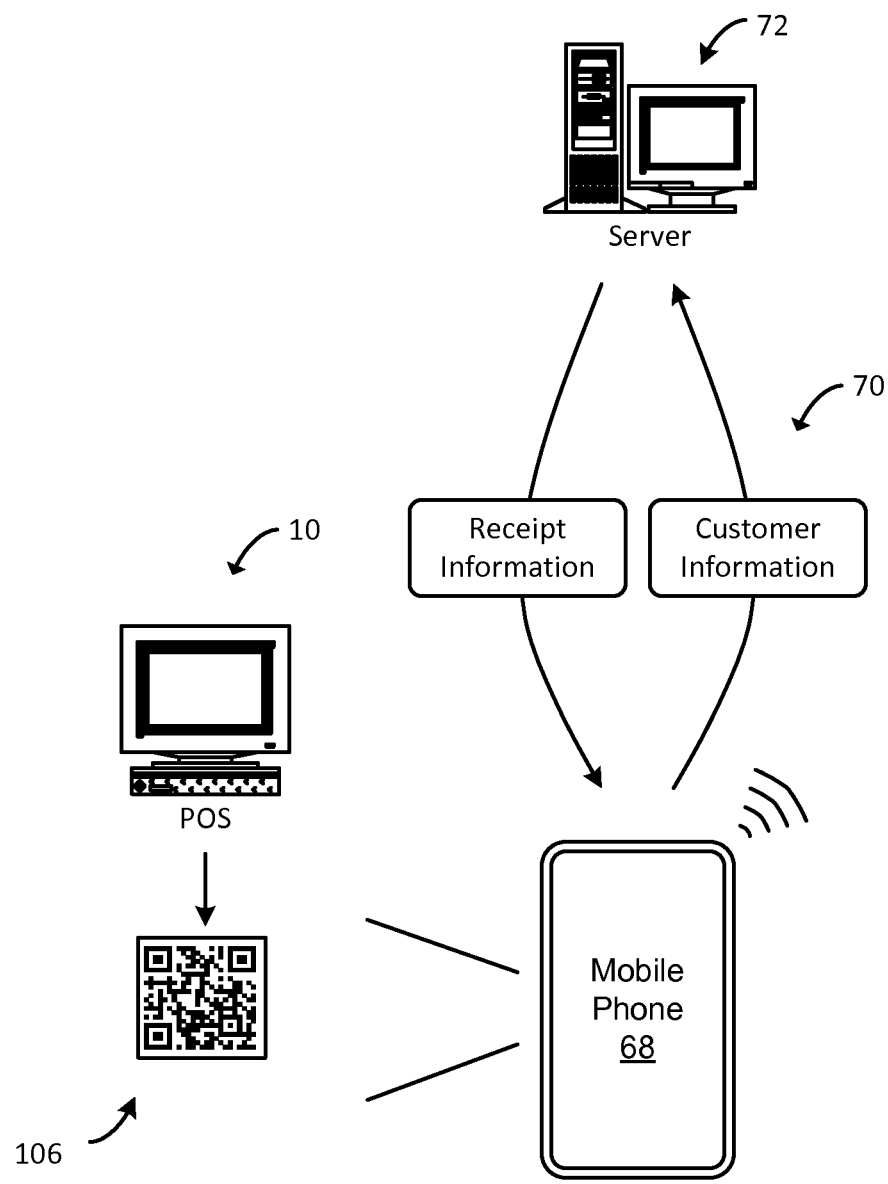
FIG. 4 is a block diagram illustrating the flow of data within one embodiment of a system in accordance with the present invention.

Referring to FIG. 4, a customer may download or may already have downloaded electronic receipts software to a mobile electronic device 68. The mobile electronic device 68 may be a smart phone, tablet PC, etc. A customer may have previously received a paper receipt 46 which includes an invitation to use electronic receipts instead of paper receipts and may have installed electronic receipts software on the mobile electronic device 68.

As indicated at 70, the customer may have an account with the computer server 72 and may transmit information to the server 72. It will be appreciated that the functionality of server 72 may be implemented by servers 26, 34, etc. The computer server 72 may likewise transmit information to the mobile device 68. The customer may receive electronic receipts on the mobile device 68 and the electronic receipts software on the mobile device 68 may enable the customer to manage electronic receipts. Additionally, the electronic receipts software may allow the customer to interact with a POS terminal 10 via the mobile electronic device 68, such as through machine readable code like QR code 106.

Figure 5:
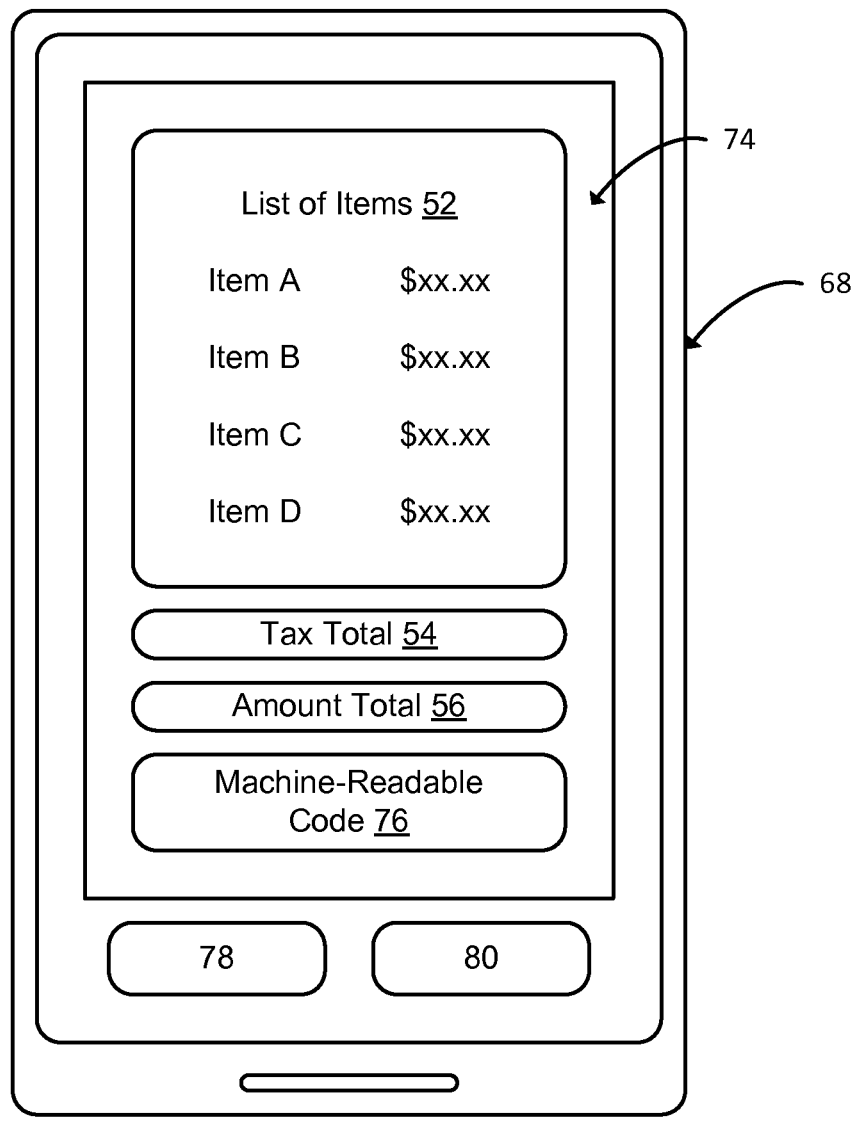
FIG. 5 is a schematic block diagram of one embodiment of a receipt viewed on a mobile electronic device in accordance with the present invention.

Referring to FIG. 5, the mobile electronic device 68 may display an electronic receipt 74 to the customer in a manner similar to the appearance of a paper receipt 46. The electronic receipts software on the mobile electronic device 68 allows a person to view their electronic receipts and to manage their receipts in many ways similar to a paper receipt. The software may provide menus, commands, or virtual buttons 78, 80 to the customer to facilitate completion of the various steps for managing electronic receipts which are discussed herein.

In order to make the receipts more usable to the customer, it is desirable to provide enhanced functionality as compared to simply providing the customer with an image of the receipt. The software may perform many functions allowing the customer to perform tasks such as reviewing receipts, and also allowing the customer to print paper receipts with the electronic receipt or otherwise select a receipt for printing and use.

The use of electronic receipts may conserve natural resources by reducing the need for and consumption of paper. Electronic receipts may also enable a consumer to more easily track and keep a highly detailed record of his or her spending. Entities issuing electronic receipts may benefit from additional marketing opportunities that the electronic receipts provide. Recipients may use electronic receipts to more easily manage their receipts. There are, however, some disadvantages to electronic receipts. In some situations it may be more difficult to verify a returns transaction from an electronic receipt. Accordingly, there are times when it is desirable for a customer to obtain a paper receipt corresponding to the electronic receipt.

Figure 6:
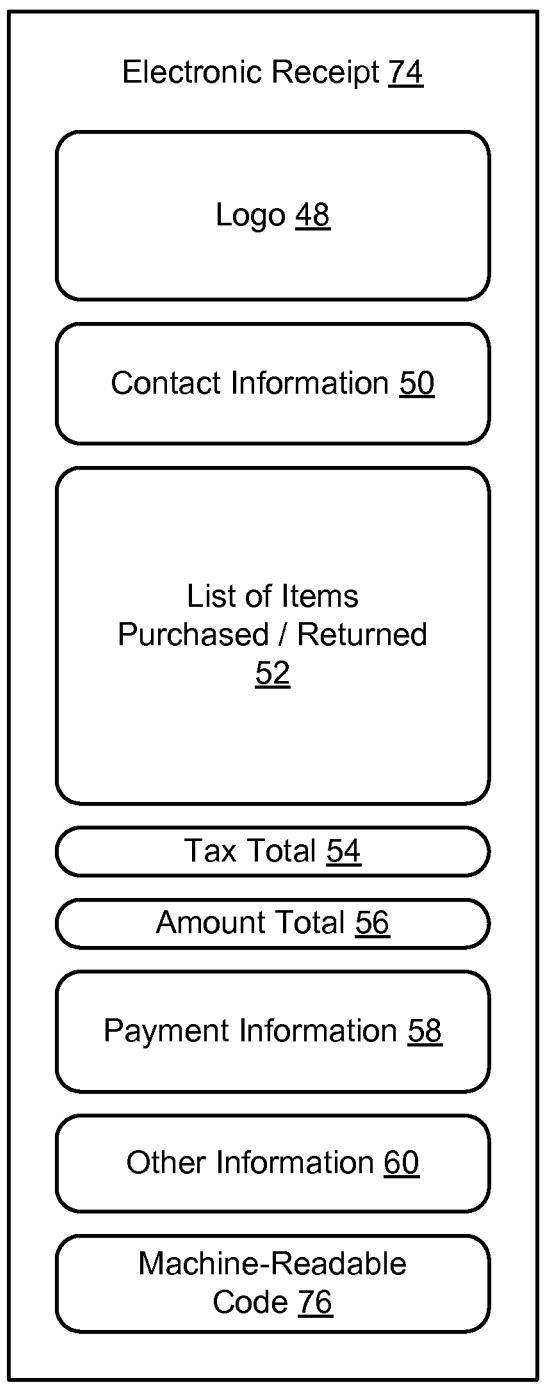
FIG. 6 is a schematic block diagram of one embodiment of a receipt in accordance with the present invention.

Referring to FIG. 6, the electronic receipt 74 is shown in greater detail. As discussed, a POS system 10 may output an electronic receipt 74 to a customer who has elected to receive an electronic receipt instead of a paper receipt. An electronic receipt 74 is often presented to a customer in a manner which is similar to a paper receipt 46. The electronic receipt 74 may include a store logo 48, contact information 50, a list 52 of items purchased or returned, a total 54 indicating the sales tax assessed or returned, a total 56 indicating 56 the amount paid or returned, payment information 58, a machine readable code 76 identifying the transaction, and other information 60 as desired, as well as combinations or sub-combinations thereof.

A machine-readable code 76 may comprise a barcode. For example, in certain embodiments, a machine-readable code 76 may comprise a conventional barcode or a two-dimensional barcode such as a QR code. Two-dimensional barcodes may support or provide more data per unit area than can be obtained using a traditional one-dimensional barcode. Moreover, two-dimensional barcodes are typically configured to be captured using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

As regards the management of electronic receipts, the data encoded within a machine-readable code 76 may encode a transaction identification (ID). A transaction ID may uniquely identify a particular transaction (e.g., the transaction documented by the corresponding receipt 74). The machine-readable code 76 may include a data hash of desired information describing the purchase transaction. For example, the code 76 may contain the store and POS terminal where the transaction occurred, the time of the transaction, the total price of the transaction, etc.

With such information, a returns associate may scan in the machine-readable code 76 or key in a corresponding alpha-numeric code which may be presented along with the machine readable code and obtain sufficient information to demonstrate the legitimacy of the receipt or otherwise work with the receipt. A returns associate may enter the machine readable code 76 or corresponding alpha-numeric code into a POS terminal 10 and retrieve the transaction data corresponding to the original transaction. A returns associate may enter the machine readable code 76 or corresponding alpha-numeric code into a POS terminal to receive the transaction data or receipts for the original transaction as well as for subsequent related transactions. The associate may enter the transaction identification code associated with the receipt into the POS terminal 10 to thereby request information regarding the original transaction and the receipt from the server 72. The server 72 may then transmit the requested information to the POS terminal 10, such as by sending information to the POS terminal to reprint the desired receipt or receipts. Herein, it is often referred to that the customer will provide information to 'a POS terminal.' It is appreciated that various modes of providing the receipt information involve providing the information to a returns associate while various other modes of providing the receipt information involve inputting the information into the POS terminal.

Figure 7:
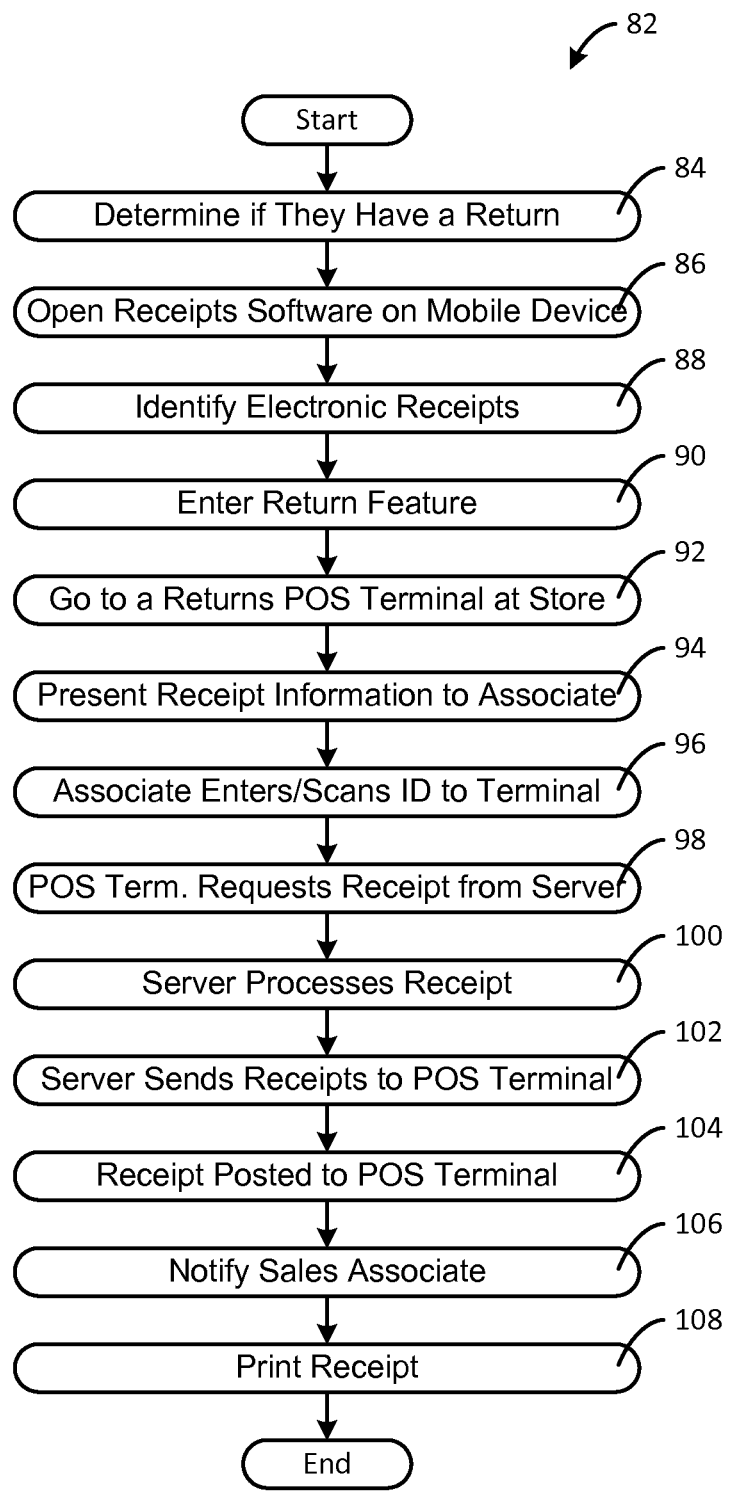
FIG. 7 is a block diagram of one embodiment of a method for printing a paper copy of a receipt in accordance with the present invention.

Referring to FIG. 7, a customer may desire to complete a return transaction for a purchase which initially generated an electronic receipt. In these situations, a store or retailer may desire an additional measure of security against fraudulent returns. FIG. 7 generally illustrates a process 82 which may be used to reprint a paper receipt and/or receipt history from an electronic receipt 74 in conjunction with a return. With electronic receipts software, the customer will have access to the receipt 74 on their mobile electronic device 68.

Generally, a person will first determine 84 if they have an item to return. The person may open 86 electronic receipts software on a mobile electronic device in order to view their receipts and find receipts to complete a return. They may then identify 88 one or more electronic receipts for reprinting. The person may enter 90 a returns feature within the electronic receipts software which may assist the person in handling the return, interfacing with the POS terminal, and receiving an updated electronic receipt if desired. The person would then typically go to a returns POS terminal 92 at a store associated with the receipts. The person will they typically communicate with and work with a returns associate to complete the return.

The person will typically present 94 receipt and return information to the returns associate. The person will typically complete customary steps, such as presenting the item to be returned to the associate and indicating a reason for the return. The person will also present receipt information to the returns associate. This may include the person showing the returns associate the electronic receipt 74 as displayed on their mobile electronic device. In some cases, the person may have a paper copy of the receipt 46 and may present the paper receipt to the returns associate.

The returns associate will then typically scan or enter 96 the receipt identification into the POS terminal. The returns associate may enter this information by scanning the machine readable code 76 into the POS terminal. POS terminals equipped with optical scanners can typically scan a machine readable code directly from the display screen of a mobile electronic device. Alternatively, the returns associate may view an alpha-numeric type code on the receipt and manually enter this code into the POS terminal. Such an alpha-numeric identifying code may be typically presented on a receipt along with a machine readable code 76 to ensure that a returns associate may work with the receipt as needed.

After the associate enters the receipt identification into the POS terminal, the POS terminal requests 98 receipt information from the server 72. The server 72 will often have a heartbeat connection to the POS terminal 10 and the POS terminal 10 can transmit a receipt reprinting request to the server. Information is sent to a server 26, 43, 72 to identify receipts for reprinting. It is appreciated that where a POS terminal operates within a local system, the POS terminal may send the receipt request to a local server which then requests the receipt data from a supervisory server.

The server 72 than processes 100 the receipt reprinting request. The server may identify the particular receipt from stored receipt data and may determine that the receipt 74 identified by the receipt identification number is a legitimate receipt. The server may also identify additional receipts related to the original receipt 74. In one configuration, receipts for related transactions (i.e. a purchase and a return of an item) are assigned and identified with the same receipt identification number. This is typically the number stored in or represented by the machine readable code 76 and associated alpha-numeric code. The server may then identify all receipts having that particular identification number. In another configuration, receipts for related transactions may be assigned and identified with different but related identification numbers or by different identification numbers. In such a configuration, the server may identify related receipts by shared aspects in the identification number or by metadata or other data linking those receipts together.

After processing 100 the receipt information and identifying the receipt and/or related receipts, the server 72 may then send 102 receipt information to the POS terminal. Where multiple related receipts are available for a transaction, the server may indicate this to the returns associate and ask whether the associate wants to print all related receipts. The returns associate may provide an answer to the server 72. The server sends 102 receipt data to the POS terminal for printing. The receipt data may be sent 102 to the POS terminal 10 in a format which is understood by the POS terminal and by a receipts printer 20b. The receipts are posted 104 to the POS terminal. The server may also notify 106 the sales associate that a receipt is being reprinted or is ready to reprint. The POS terminal reprints 108 the receipt, typically by transmitting the receipt information to a receipts printer 20b.

In processing 100 a receipt for reprinting, the server receipts management system (broadly including devices such as the POS terminal 10, server 72, etc.) may modify a receipt to make it more suited for a particular purpose when reprinting the receipt. An important purpose for allowing a returns associate to reprint a receipt is to assist in preventing fraudulent returns. As such, the receipt may be modified to make it easier for the sales associate to complete the returns transaction.

Figure 8:
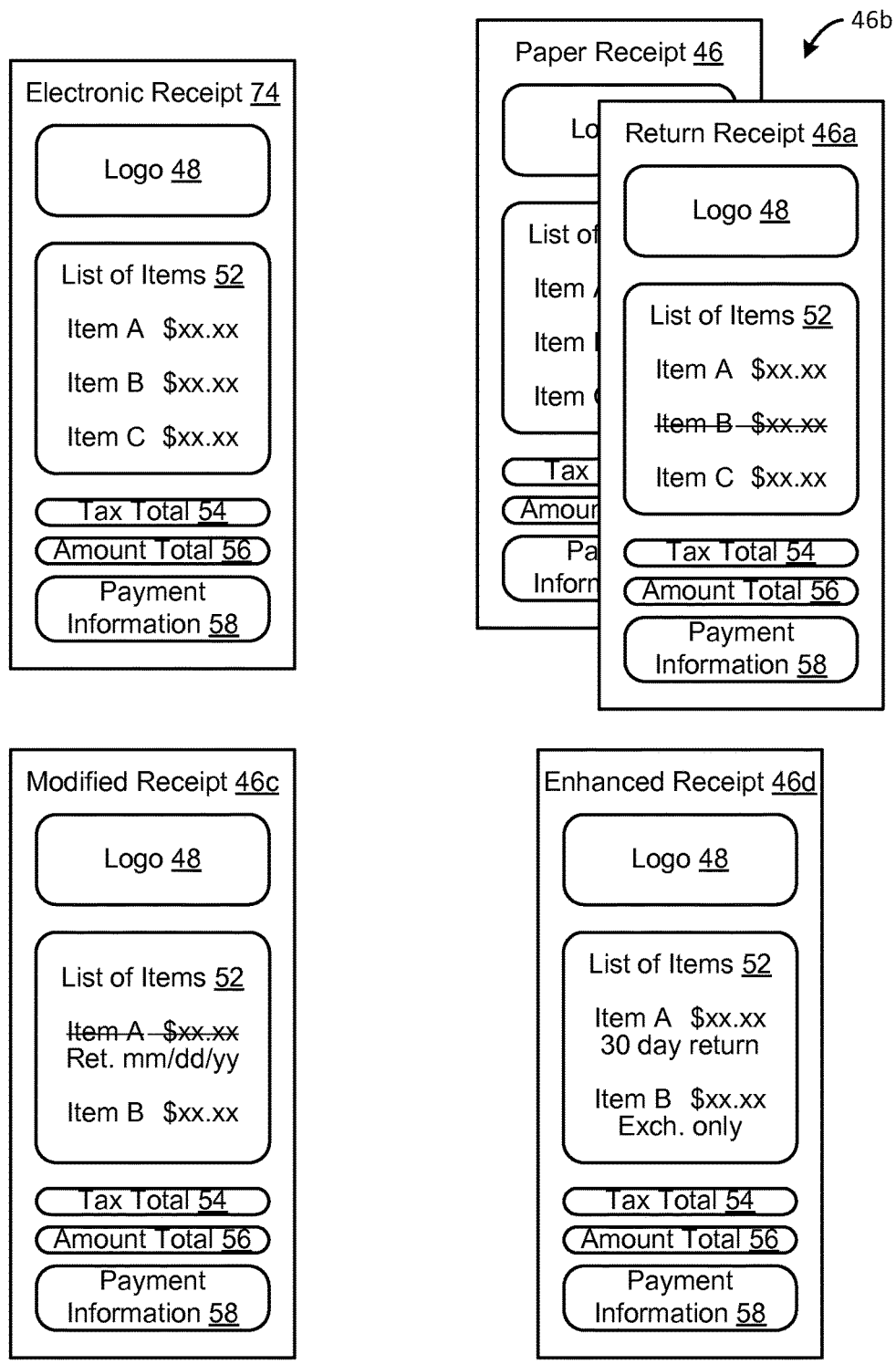
FIG. 8 shows schematic diagrams of various receipts according to the present invention.

Referring to FIG. 8, various modified receipts which have been reprinted from a receipt according to the present system are shown. The receipts management system (these receipt modification tasks are often performed the server 72, 26, 34) may modify the original receipt to show related receipts or related transactions. In one configuration, the system may identify all receipts 46a for transactions related to the original receipt 46, 74 and may transmit all of these receipts 46b to the POS terminal for printing. These related receipts 46b may typically be printed in chronological order, and may also include a summary timeline of the related transactions to assist the returns associate in determining how to handle the return. The receipts management system may modify the original receipt to show related receipts or related transactions in a single combined receipt 46c. The system may identify receipts for related transactions (such as a return or exchange) and may modify the original receipt so that the receipt is printed as a single combined receipt 46c which reflects these changes. For example, the receipt 46c may show certain items as lined out where they have been returned and may print date next to the item to show the associate when the item was returned. The modified receipt 46c may give a summary timeline of the related transactions to assist the returns associate. Printing the full receipt/transaction history for an item in question can be very important for preventing fraudulent returns.

The receipts management system may modify the original receipt to show additional information to the returns associate on an enhanced receipt 46d. For example, the enhanced receipt 46d may show the returns policy for the items on the receipt. The returns policy may be briefly stated adjacent each item, such as below the item. The returns policy may be briefly stated in a few words or a single line by descriptions such as "30 days," "exchange only," "exchange only if opened," etc. The modified receipt 46d may also be enhanced to highlight relevant dates, etc. Additionally, a modified receipt may be reprinted with a different header, such as by indicating that the receipt is a reprinted copy or that the receipt is for store use only.

Figure 9:
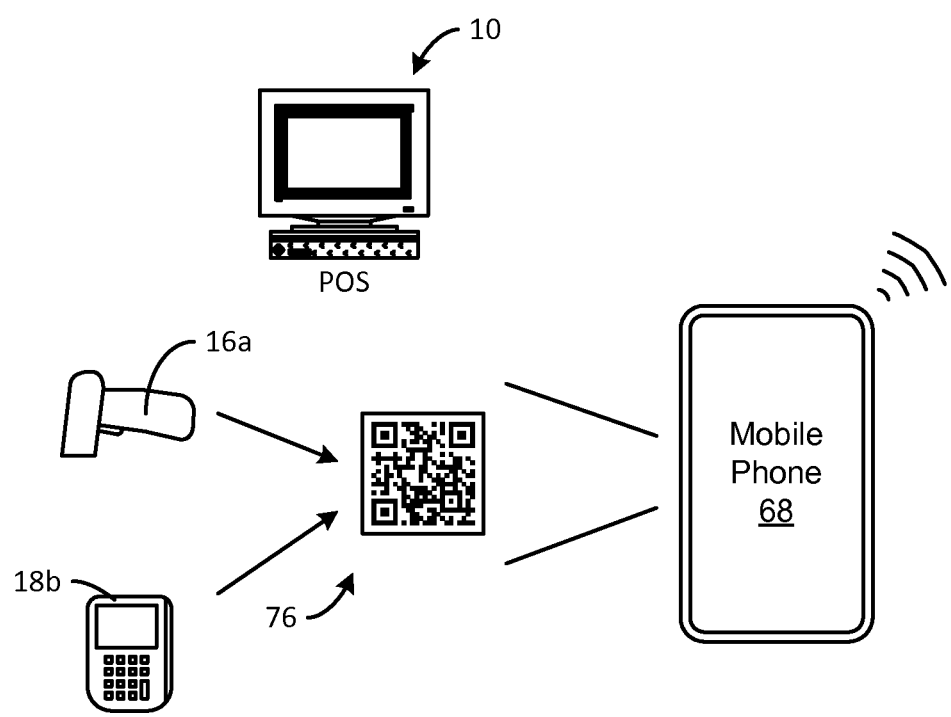
FIG. 9 is a block diagram illustrating a method of transmitting information between a mobile electronic device and a POS terminal according to the present invention.

Referring to FIG. 9, the customer will typically interact with a POS terminal and a returns associate in completing a return (return, exchange, etc.). Although there may be other reasons for reprinting a receipt according to the present invention, facilitating returns and preventing fraud in returns is a significant use of the present invention. Typically, the customer will transmit receipt identification to the POS terminal 10. This may be accomplished by providing a machine readable code 76 to the returns associate and POS terminal. The returns associate may use a scanner 16a to capture the machine readable code 76 and transmit the machine readable code to the POS terminal. Alternatively, the customer or the returns associate may manually enter a corresponding alpha-numeric code into a keypad, such as may be present on a debit card reader 18b. Providing 94 the receipt identification to the POS terminal allows the returns associate to obtain receipt information and to reprint a receipt as discussed.

In another configuration, a customer may pair with a POS terminal 10 in order to facilitate reprinting the receipts. The customer may capture a QR code at the POS terminal with their mobile electronic device 68 or otherwise enter a code into their mobile electronic device to pair with the POS terminal. The QR code may be displayed to the customer and may identify the particular POS terminal and store where the customer is located. Alternatively, the customer may pair with the POS terminal by entering identifying information into the POS terminal, such as by entering the phone number associated with their mobile electronic device into a keypad such as on a debit card reader 18b. This phone number may be the phone number associated their mobile electronic device and their customer account with the retailer. Pairing the mobile electronic device 68 with the POS terminal may allow the customer to transmit the receipt identification to the POS terminal to allow the present receipt reprinting and returns process to proceed. By way of example, the receipt identification data may be transmitted from the mobile electronic device to the server 72 over the device network and then transmitted from the server to the POS terminal 10 over the store communication network.

Figure 10:
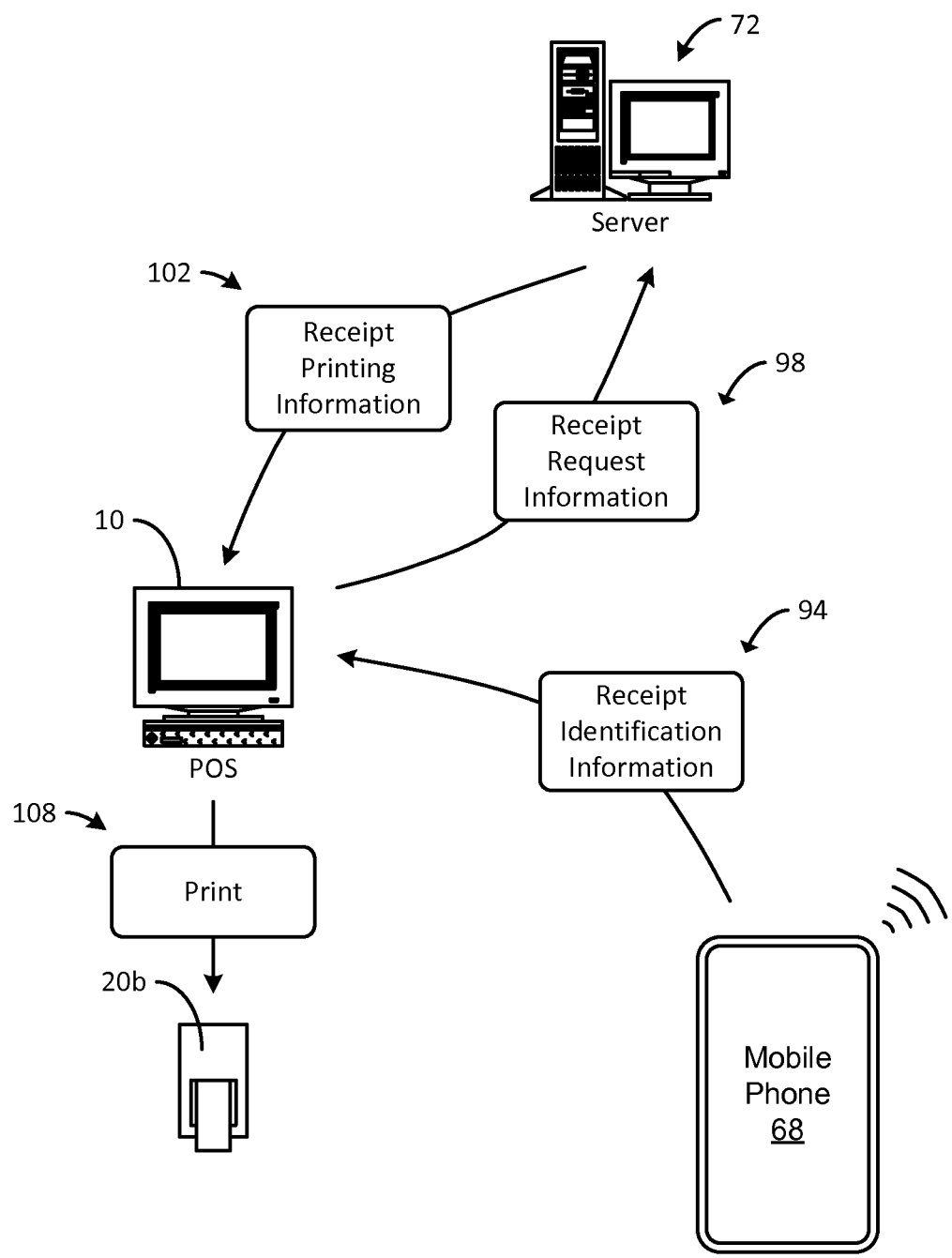
FIG. 10 is a block diagram illustrating the flow of data within one embodiment of system in accordance with the present invention.

Turning now to FIG. 10, the general flow of information for reprinting receipts is shown. After the customer has approached 92 a POS terminal 10, the customer will typically identify 88 receipt information on the mobile electronic device 68 and will typically provide 94 receipt identification information to the sales associate and to the POS terminal 10. The receipt information will contain the information necessary to identify the desired receipt. The POS terminal 10 may send the server 72 information identifying the particular receipt or receipts for reprinting, information regarding particular print formatting of the receipts, as well as other necessary information.

The POS terminal 10 may often maintain a heartbeat signal with the server 26, 34, 72. The POS terminal may expect that a receipt will be delivered for printing. The POS terminal may then request 98 receipt information from the server. The server may process 100 the request (including any desired modification of the receipt) and may deliver 102 the receipt data to the POS terminal 10 and the receipts which are to be printed may be posted 104 to the POS terminal. Typically, the server 72 will deliver the receipts to the POS terminal 10 in the same format that the POS terminal typically uses for creating and printing receipts, allowing the POS terminal and the receipt printer 20b to understand the receipt information.

The POS terminal 10 may notify the sales associate that a receipt has been received for a customer. The returns associate may then cause the receipt to be printed when the customer is ready for the receipt. Alternatively, the POS terminal may automatically print the receipt when ready. In either case, the receipt may be sent to a receipt printer 20b and printed 108. The returns associate may use the receipt to evaluate a return, exchange, etc. that has been requested by the customer. Additional information provided as part of a modified receipt 46a-46d may be used by the returns associate in making this evaluation. In many cases, the receipt may be marked as a reprinted receipt or for store use only and might not be presented to the customer.

Figure 11:
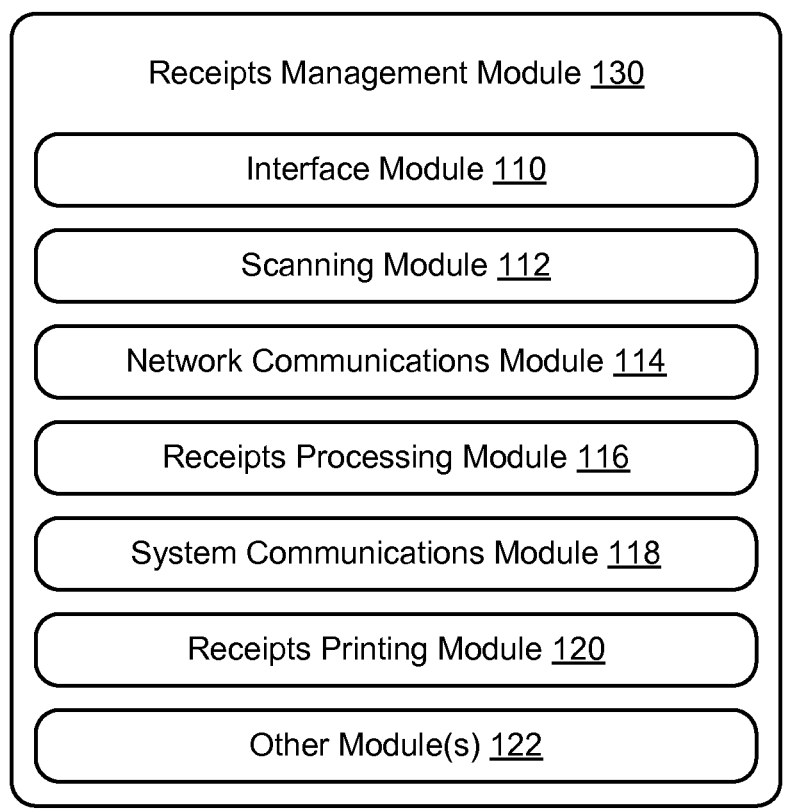
FIG. 11 is a schematic block diagram of one embodiment of a receipts management module in accordance with the present invention.

Referring to FIG. 11, a receipts management system in accordance with the present invention may include a receipts management module 130. The various functions or modules of a receipts management module 130 may be enacted or implemented by any suitable system or component thereof. For example, in selected embodiments, one or more functions or modules of a receipts management module 130 may be distributed across one or more hardware devices, including a mobile electronic device 68, a primary computer 12 of a POS system 10, a local server 26, a supervisory server 34 or 72, some other onsite resource, some other offsite resource, or the like or combinations or sub-combinations thereof. Thus, systems and methods in accordance with the present invention may be adapted to a wide variety of situations, including more rigid legacy systems.

In selected embodiments, a receipts management module 130 facilitates the receipts printing process described herein. The receipts management module may include any suitable arrangement of sub-components or modules. The receipts management module 130 may include an interface module 110 which interfaces with a customer. The interface module may include a display on a mobile electronic device 68. The receipts management module 130 may also include a scanning module 112 which may include a camera on a mobile electronic device 68 and which facilitates scanning machine readable codes such as QR codes. The scanning module 112 may also include a scanner 16a which facilitates the POS terminal 10 scanning machine readable codes. The receipts management module 130 may include a network communications module 114 which may facilitate communications between the mobile electronic device 68 and the server 26, 34, 72.

The receipts management module 130 may include a receipts processing module 116 which may facilitate processing receipts and preparing receipts for reprinting. The receipts management module 130 may include a system communications module 118 which may communicate between a POS terminal 10 and a server 26, 34, 72 and which may transmit receipt information from the server to the POS terminal. The receipts management module 130 may also include a receipts printing module 120 which facilitates printing receipts for the customer at a store. The receipts management module 130 may also include other modules 122 as are desirable to implement aspects of the present invention. The various modules and parts of the receipts management module 108 may include both hardware, firmware and software components as are desirable to accomplish the present invention and to achieve the various steps, features, and functionality discussed herein.

The flowchart and block diagrams of the Figures illustrate the architecture, functionality, and operation of possible implementations of systems, methods, and computer program products according to one or more embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for reprinting a receipt comprising:
   providing an application installed on a mobile electronic device, the mobile electronic device including a camera:
   prompting, by the application, a customer to capture a barcode of an original receipt from a retailer, wherein the retailer stores a copy of the original receipt on a receipts management server, the receipts management server communicatively coupled to a sales terminal;
   receiving, by the application from the receipts management server, a copy of the original receipt for storage on the mobile electronic device;
   displaying, by the application, information identifying the original receipt on the mobile electronic device, the information encoded in a machine-readable code;
   scanning, by a scanner of the sales terminal, the machine-readable code from the mobile electronic device;
   transmitting, by the sales terminal to the receipts management server, the information identifying the original receipt;
   processing, by the receipts management server, the information identifying the original receipt;
   determining, by the receipts management server, that the information identifying the original receipt matches the stored copy of the original receipt;
   in response to the determination that the original receipt matches the stored copy of the original receipt, preparing, by the receipts management server, a summary timeline including two or more transactions, the two or more transactions including at least one purchase and at least one return of a single item identified on the original receipt;
   generating, by the receipts management server, a modified electronic receipt including the summary timeline;
   transmitting, by the receipts management server, the modified electronic receipt from the receipts management server to the sales terminal;
   printing a paper copy of the modified electronic receipt at a receipts printer associated with the sales terminal;
   sending, by the receipts management server, the modified electronic receipt to the application;
   rendering, by the application, an image of the modified receipt electronic receipt information and the summary timeline; and
   displaying, by the application, the rendered image on the mobile electronic device.

2. The method of claim 1, further comprising:
   the server identifying an additional receipt for an additional transaction which is related to the original receipt.

3. The method of claim 2, wherein the modified receipt comprises multiple receipts including the additional receipt and the original receipt.

4. The method of claim 2, wherein the modified receipt comprises a single receipt showing an original transaction related to the original receipt and showing the additional transaction.

5. The method of claim 2, wherein the modified receipt comprises additional information for an item on the original receipt.

6. The method of claim 5, wherein the modified receipt comprises returns policy information for an item on the original receipt.

7. The method of claim 5, wherein the modified receipt indicates dates which are relevant to the return of an item on the original receipt.

8. The method of claim 1, further comprising:
   a returns associate reviewing the modified receipt; and
   the returns associate evaluating a proposed item return in light of the modified receipt.

9. A sales system for reprinting receipts, the sales system comprising:
   a receipts management server of a retailer;
   an application installed on a mobile electronic device, the mobile electronic device including a camera, wherein the application is configured to:
      prompt a customer to capture a barcode of select an original receipt from a retailer, wherein the retailer stores a copy of the original receipt on the receipts management server,
      receive, from the receipts management server a copy of the original receipt for storage on the mobile electronic device,
      display information identifying the original receipt on the mobile electronic device, the information encoded in a machine-readable code;
   a sales terminal of the retailer, the sales terminal communicatively coupled to the receipts management server and:
   having a scanner configured to scan the machine-readable code from the mobile electronic device;
   having a receipts printer configured to print paper copies of electronic receipts; and
   being configured to transmit to the receipts management server the information identifying the original receipt;
   one or more processors; and
   one or more memory devices operably connected to the one or more processors, the one or more memory devices collectively storing:

a receipts management module configured to:
process the information identifying the original receipt,
determine that the information identifying the original receipt matches the stored copy of the original receipt;
in response to the determination that the original receipt matches the stored copy of the original receipt, preparing, by the receipts management server, a summary timeline including two or more transactions, the two or more transactions including at least one purchase and at least one return of a single item identified on the original receipt, generate a modified electronic receipt including the summary timeline: transmit the modified electronic receipt from the receipts management server to the sales terminal: and
wherein the receipts printer of the sales terminal is further configured to print a paper copy of the modified electronic receipt: and wherein the application is further configured to:
render an image of the modified electronic receipt, and
display the rendered image on the mobile electronic device.

10. The sales system of claim 9, wherein the machine-readable code comprises a barcode.

11. The sales system of claim 9, wherein the machine-readable code comprises a QR code.

12. The sales system of claim 9, wherein the machine-readable code encodes at least one unique transaction identifier.

* * * * *